US012594845B2

(12) United States Patent
Sugimura

(10) Patent No.:  US 12,594,845 B2
(45) Date of Patent:      Apr. 7, 2026

(54) TRAVELING VEHICLE

(71) Applicant: HONDA MOTOR CO., LTD., Tokyo (JP)

(72) Inventor: Kentaro Sugimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 18/264,462

(22) PCT Filed: Feb. 9, 2021

(86) PCT No.: PCT/JP2021/004774

§ 371 (c)(1),
(2) Date: Aug. 7, 2023

(87) PCT Pub. No.: WO2022/172325

PCT Pub. Date: Aug. 18, 2022

(65) Prior Publication Data

US 2024/0109455 A1     Apr. 4, 2024

(51) Int. Cl.
B60L 50/60          (2019.01)
B60L 53/80          (2019.01)

(52) U.S. Cl.
CPC ............... B60L 50/66 (2019.02); B60L 53/80 (2019.02); *B60Y 2200/114* (2013.01)

(58) Field of Classification Search
CPC .......... B60L 50/64; B60L 50/66; B60L 53/80; B60Y 2200/114; B62D 21/183; B60K 2001/0416
See application file for complete search history.

(56) References Cited

U.S. PATENT DOCUMENTS

| | | | |
|---|---|---|---|
| 8,479,858 B2 * | 7/2013 | Kodaira ................ | B62D 21/17 |
| | | | 180/68.5 |
| 10,703,198 B2 * | 7/2020 | Kronsteiner .......... | B60K 17/22 |
| 2002/0003052 A1 | 1/2002 | Hayashi | |
| 2015/0127206 A1 | 5/2015 | Tsuji et al. | |
| 2016/0129937 A1 | 5/2016 | Suzuki | |

(Continued)

FOREIGN PATENT DOCUMENTS

| | | |
|---|---|---|
| JP | 2000-051279 A | 2/2000 |
| JP | 2002-019655 A | 1/2002 |

(Continued)

OTHER PUBLICATIONS

Japanese Office Action dated Apr. 8, 2025 issued in corresponding Japanese application No. 2022-581048; English machine translation included (8 pages).

(Continued)

*Primary Examiner* — James J Taylor, II
(74) *Attorney, Agent, or Firm* — Rankin, Hill & Clark LLP

(57) ABSTRACT

A traveling vehicle includes a body having a seat in which a user can sit, and a plurality of wheels provided to the body, the height of a seat surface of the seat being lower than the upper parts of the plurality of wheels. In the body, a battery accommodation section that accommodates a battery is provided to a side of the seat. At least part of the battery accommodation section overlaps the seat in a side view of the body, and the battery accommodation section is tilted such that a rear end part is positioned higher than a front end part.

11 Claims, 4 Drawing Sheets

(56) References Cited

U.S. PATENT DOCUMENTS

| | | | |
|---|---|---|---|
| 2017/0225715 A1 | 8/2017 | Kobayashi et al. | |
| 2020/0283084 A1 | 9/2020 | Carmignani et al. | |
| 2024/0116349 A1* | 4/2024 | Sugimura | B60L 50/64 |
| 2024/0140192 A1* | 5/2024 | Swoboda | H02K 21/22 |
| 2024/0174069 A1* | 5/2024 | Ukoko-Rongione | B60L 58/10 |

FOREIGN PATENT DOCUMENTS

| | | | | |
|---|---|---|---|---|
| JP | 2002282307 A | * | 10/2002 | |
| JP | 2003-251078 A | | 9/2003 | |
| JP | 2007-060806 A | | 3/2007 | |
| JP | 2013-017248 A | | 1/2013 | |
| JP | 2014-125094 A | | 7/2014 | |
| JP | 5645043 B | | 12/2014 | |
| JP | 2015-091200 A | | 5/2015 | |
| JP | 2016-027776 A | | 2/2016 | |
| JP | 2017-132337 A | | 8/2017 | |
| JP | 2017-137003 A | | 8/2017 | |
| WO | WO-2017022394 A1 | * | 2/2017 | B60L 53/80 |

OTHER PUBLICATIONS

International Search Report, International Application No. PCT/JP2021/004774, Date of mailing: Apr. 13, 2021, 3 pages.

* cited by examiner

12(10)

12A(10A)

TRAVELING VEHICLE

TECHNICAL FIELD

The present invention relates to a traveling vehicle that travels based on power supply from a battery.

BACKGROUND ART

In recent years, electric traveling vehicles equipped with batteries are being developed from the viewpoint of convenience and environmental protection. Traveling vehicles used for racing or recreational purposes are no exception. For example, JP 2007-060806 A discloses an electric racing kart (traveling vehicle) equipped with a motor and a battery for supplying electric power to the motor. This traveling vehicle includes a pair of batteries sideward of a seat on which a user sits.

SUMMARY OF THE INVENTION

In the case of the traveling vehicle of JP 2007-060806 A, since the batteries are provided sideward of the seat, a large amount of relative wind hits the batteries during traveling. In particular, because a traveling vehicle used for racing is configured to be lightweight, the traveling of the vehicle is easily disturbed under the influence of the relative wind. In addition, in a case where a large-sized battery is mounted in order to drive the traveling vehicle for a long time, there is a possibility that the battery will block a side view of the user sitting on the seat.

The present invention has been made in view of the above circumstances, and an object of the present invention is to provide a traveling vehicle in which a sufficient field of view is acquired and the traveling stability is further improved with a lesser influence of the relative wind.

According to an aspect of the present invention, there is provided a traveling vehicle including: a vehicle body having a seat on which a user sits; and a plurality of wheels provided to the vehicle body, wherein a height of at least part of a seating surface of the seat is lower than upper portions of the plurality of wheels, the vehicle body includes, at a side of the seat, a battery housing portion that houses a battery, and the battery housing portion inclines in a manner so that at least part of the battery housing portion overlaps the seat in a side view of the vehicle body and a rear end portion of the battery housing portion is positioned higher than a front end portion of the battery housing portion.

The above traveling vehicle can provide a sufficient field of view and further improve the traveling stability by reducing the influence of the relative wind.

DETAILED DESCRIPTION OF THE INVENTION

A description will be presented and described in detail below with reference to the accompanying drawings concerning an embodiment of the present invention.

Figure 1:
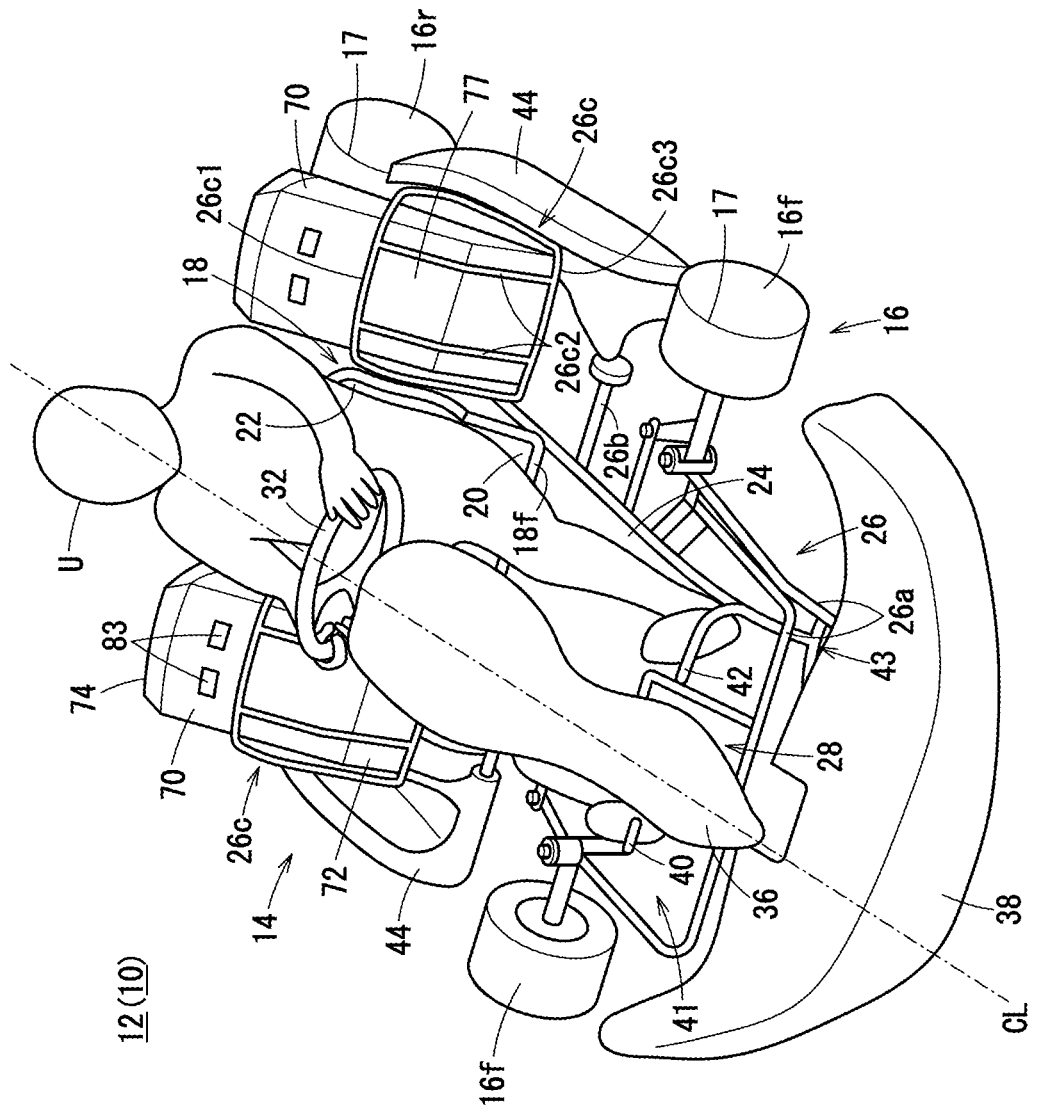
FIG. 1 is a perspective view showing an overall configuration of a racing kart that is a traveling vehicle according to an embodiment of the present invention.

As shown in FIG. 1, a traveling vehicle 10 according to one embodiment of the present invention is configured as an electric racing cart (hereinafter, simply referred to as a racing kart 12) used in a dedicated racing place, a game facility, and suchlike. The racing kart 12 includes a vehicle body 14 and a plurality of (four) wheels 16 attached to the vehicle body 14. The vehicle body 14 includes a seat 18 on which a user U who is a driver sits. In the case of this type of racing kart 12, in order to suppress the influence of the relative wind as much as possible, the height (a position in the vehicle height direction) of at least part of a seating surface 20 of the seat 18 with which the buttocks of the user U come into contact is set lower than the height of the upper portions (specifically, upper ends 17) of the plurality of wheels 16. A backrest portion 22 of the seat 18 inclines rearward and upward from the seating surface 20. The traveling vehicle 10 is not limited to the racing kart 12 and may be, for example, a vehicle that can run on a public road, an amusement toy, and suchlike. In addition, the seating surface 20 of the seat 18 may be horizontal with respect to a road surface R, and the backrest portion 22 of the seat 18 may be vertical or substantially vertical with respect to the seating surface 20 provided horizontally.

The racing kart 12 is for one person, and the vehicle body 14 is configured to be short (compact) in the front-rear direction. The length of the vehicle body 14 in the front-rear direction is set in a range of about 1 m to 2 m, for example. The vehicle width of the vehicle body 14 is shorter than the length of the vehicle body 14 in the front-rear direction. The seat 18 is provided on a widthwise center line CL, a center line with respect to the vehicle width direction of the vehicle body 14. The vehicle body 14 includes a pair of front wheels 16f (part of the four wheels 16) further forward than the seat 18 and a pair of rear wheels 16r (part of the four wheels 16) further rearward than the seat 18.

The vehicle body 14 of the racing kart 12 is formed by mutually assembling a main panel 24 that extends in the front-rear direction with the seat 18 fixed to an upper surface, and a plurality of frames 26 fixed to the main panel 24. The main panel 24 has appropriate rigidity, is formed to be substantially the same as the width of the seat 18, and constitutes a floor portion of the racing kart 12. The legs of the user U sitting on the seat 18 are rested, being stretched forward along the main panel 24.

Figure 2:
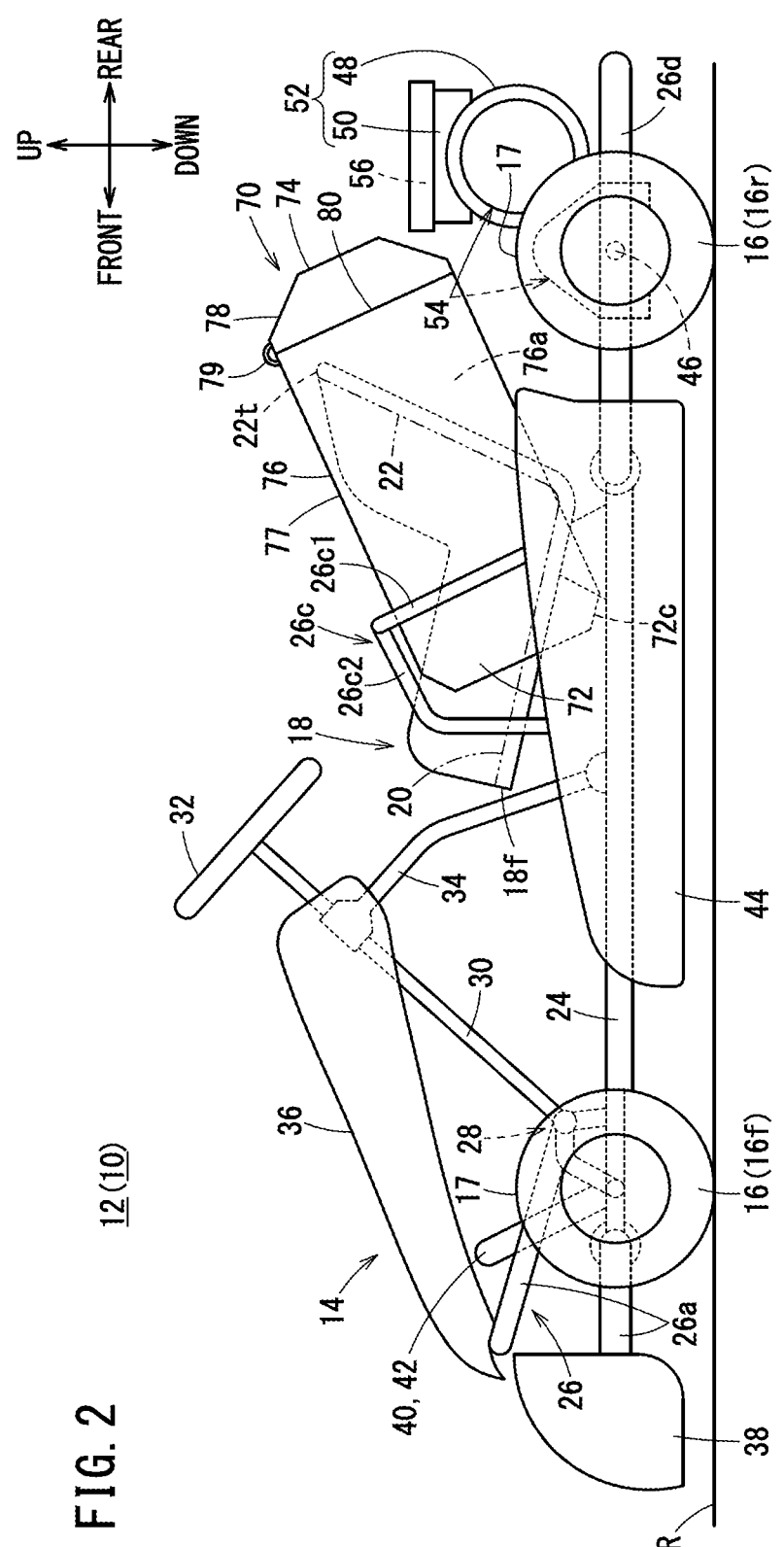
FIG. 2 is a side view of the racing kart.

As shown in FIGS. 1 and 2, a steering mechanism 28 for steering the pair of front wheels 16f is provided on the front side of the main panel 24. The steering mechanism 28 includes a steering shaft 30 inclining rearward and upward, and a handle 32 that is gripped and operated by the user U and is provided at an upper end of the steering shaft 30. The centers of the steering shaft 30 and the handle 32 are provided on the widthwise center line CL of the vehicle body 14.

The steering mechanism 28 changes a turning amount of the pair of front wheels 16f following a rotating amount of the steering shaft 30 by combining a frame, a hinge, and suchlike (not shown) on a lower side of the steering shaft 30. The steering shaft 30 is pivotally supported by a pivotal support frame 34 fixed to the main panel 24 at a position under the seat 18. The shaft support frame 34 extends obliquely forward and upward from the main panel 24. A starter switch (not shown) and suchlike for turning on and off the start of the racing kart 12 is provided on a surface of the shaft support frame 34 facing the user U.

The steering shaft 30 is covered by a steering cowl 36. The steering cowl 36 extends to a front frame 26a (part of the plurality of frames 26) coupled to the main panel 24. A front bumper 38 for mitigating an impact from the front of the vehicle body 14 is provided on a further distal end side than the front frame 26a.

An accelerator pedal 40 and a brake pedal 42 are provided on a front side of the main panel 24. The accelerator pedal 40 and the brake pedal 42 include a plurality of frames 26. The accelerator pedal 40 and the brake pedal 42 are provided so as to sandwich the steering shaft 30 (steering cowl 36). For example, the accelerator pedal 40 is located on the right side of the steering shaft 30 when viewed from the user U, and the sole of the right foot is placed on the accelerator pedal 40 when the user U drives the racing kart 12. The brake pedal 42 is located on the left side of the steering shaft 30 when viewed from the user U, and the sole of the left foot is placed on the brake pedal 42 when the user U drives the racing kart 12.

The accelerator pedal 40 is provided to be able to act on an accelerator mechanism 41 fixed to the main panel 24. The accelerator mechanism 41 electrically or mechanically transmits an accelerator operation amount (a depression amount of the accelerator pedal 40) of the user U to an ECU 56 (Electronic Control Unit) for travel control that is described later. The brake pedal 42 is provided to be able to act on a brake mechanism 43 fixed to the main panel 24. For example, the brake mechanism 43 preferably adopts a structure (hydraulic, wire, and suchlike) capable of mechanically applying a braking force to a braking unit (not shown) that brakes the pair of front wheels 16f and rear wheels 16r.

The vehicle body 14 includes a pair of side bumpers 44 on both sides in the vehicle width direction. The pair of side bumpers 44 extend in the front-rear direction (vehicle length direction) of the vehicle body 14 between the front wheels 16f and the rear wheels 16r. Outer side surfaces of the pair of side bumpers 44 in the vehicle width direction slightly protrude further outward than the wheels 16. The inner side of each side bumper 44 is connected to a pair of side frames 26b extending in the vehicle width direction from the main panel 24 and to a housing portion frame 26c supporting a battery case 70 described later.

A rear frame 26d extending further rearward than the seat 18 is coupled to the rear of the main panel 24. The rear frame 26d rotatably supports an axle 46 extending in the vehicle width direction. The rear wheel 16r is fixed to each of end portions of the axle 46 in the vehicle width direction.

The rear frame 26d is provided with a PU 52 (Power Unit) in which a motor 48 and a power adjustment unit 50 for adjusting power supplied to the motor 48 are integrally formed. The PU 52 constitutes part of an electrical unit of the racing kart 12 and is arranged on the widthwise center line CL at the rear of the vehicle body 14. The upper end of the PU 52 is lower in the vehicle height direction than the upper end 22t of the backrest portion 22, and the PU 52 is fixed to a rear side of the seat 18 (a position overlapping the backrest portion 22 as viewed in the front-rear direction of the vehicle body 14). At least part of the PU 52 is provided at a position overlapping the pair of rear wheels 16r in a side view of the vehicle body 14. Although the PU 52 is provided on the rear side of the pair of rear wheels 16r in the present embodiment, the PU 52 may be provided at a position behind and adjacent to the seat 18 (on the front side of the pair of rear wheels 16r) as long as at least part of the PU 52 overlaps the pair of rear wheels 16r in a side view of the vehicle body 14. Because at least part of the PU 52 is fixed to the rear side of the seat 18 (a position overlapping the backrest portion 22 as viewed in the front-rear direction of the vehicle body 14), the influence of the relative wind coming from the front on the PU 52 can be suppressed. Therefore, the racing kart 12 can travel, suppressing the drag caused by the relative wind. In addition, because at least part of the PU 52 is provided at a position overlapping the pair of rear wheels 16r in a side view of the vehicle body 14, it is possible to apply a load to a position in the vicinity of each rear wheel 16r and increase a gripping force of each rear wheel 16r. That is, the traveling stability of the racing kart 12 can be enhanced.

The motor 48 rotates based on electric power supplied from a battery 60, which is a power source, and rotates the axle 46 via a driving force transmission mechanism 54. The motor 48 is only required to output an appropriate rotational driving force capable of smoothly rotating the pair of rear wheels 16r. Either an AC motor or a DC motor may be adopted as the motor 48.

The driving force transmission mechanism 54 includes a plurality of gears, pulleys, chains, and suchlike provided between an output shaft of the motor 48 and the axle 46, and transmits the rotational driving force of the motor 48 to the axle 46. For example, a centrifugal clutch that seamlessly connects the clutch based on an operating amount of the accelerator pedal 40 can be adopted as the driving force transmission mechanism 54.

The power adjustment unit 50 is provided above the motor 48. The power adjustment unit 50 appropriately adjusts the power of the battery 60 supplied to the motor 48 under the control of the ECU 56. When the motor 48 is an AC motor, the power adjustment unit 50 is configured to convert the DC power of the battery 60 into three-phase AC power and supply the three-phase AC power to the motor 48.

The racing kart 12 includes the battery case 70 (battery housing portion) that detachably houses the battery 60. The battery case 70 according to the present embodiment is provided at each side of the seat 18 (two battery cases 70 in total). The two battery cases 70 are provided at positions symmetrical to each other with respect to the widthwise center line CL of the vehicle body 14.

Each battery case 70 is formed in an elongated rectangular tube shape from a front end portion 72 (including at least a later-described bottom wall 84 provided at a position facing a later-described lid 78 and/or a later-described opening 80) to a rear end portion 74 (including at least the lid 78 described later and/or the opening 80 described later). Each battery case 70 is fixed to a pair of housing portion frames 26c coupled to the main panel 24 at positions laterally adjacent to the seat 18. The pair of housing portion frames 26c are configured in a basket shape capable of housing the front end portion 72 (lower portion) of each battery case 70 by mutually coupling a surrounding frame 26c1 surrounding the side periphery of the battery case 70, a plurality of vertical frames 26c2 extending forward-downward from the surrounding frame 26c1, and a plurality of lateral frames 26c3 to which the plurality of vertical frames 26c2 are coupled and which support the side bumper 44.

A holding opening configured by the surrounding frame 26c1 and into which the battery case 70 can be inserted inclines rearward and upward. Each battery case 70 inserted into each housing portion frame 26c through the holding opening assumes an inclined posture in accordance with the shape of each housing portion frame 26c. A corner portion 72c (see FIG. 2) on the lowermost end side of the front end portion 72 of each battery case 70 is coupled to a predetermined lateral frame 26c3 by appropriate fixing means such as welding. A junction box (not shown) that distributes electric power from the battery 60 to the PU 52, the ECU 56, and suchlike is provided at a coupling portion between the battery case 70 and the lateral frame 26c3 (or at the main panel 24 adjacent to the coupling portion). The junction box may be provided on the front end portion 72 side in the battery case 70.

Each battery case 70 fixed to the housing portion frame 26c described above inclines in a manner so that at least part of the battery case 70 overlaps the seat 18 and the rear end portion 74 is positioned higher than the front end portion 72 in a side view of the vehicle body 14. The battery cases 70 installed at both sides of the seat 18 in the vehicle width direction are fixed in the same posture in a side view of the vehicle body 14. That is, the racing kart 12 fixes the pair of battery cases 70 at positions symmetrical to each other and in the same posture with respect to the widthwise center line CL as a base point (axis of symmetry). Thus, the center of gravity of each battery 60 can be caused to coincide with the widthwise center line CL in a state in which the battery 60, which is a heavy object, has been housed in each battery case 70.

Each battery case 70 is disposed between the seat 18 and the side bumper 44. The side bumper 44 protrudes most outward in the vehicle width direction at the position of the battery case 70 (the housing portion frame 26c). The front end portion 72 of each battery case 70 is located further rearward than a front end 18f of the seat 18. Accordingly, a space for the user U to get on the seat 18 is acquired between the front wheels 16f and the side frames 26b. The front end portion 72 is provided further forward than the rear wheels 16r in a side view of the vehicle body 14.

Figure 3A:
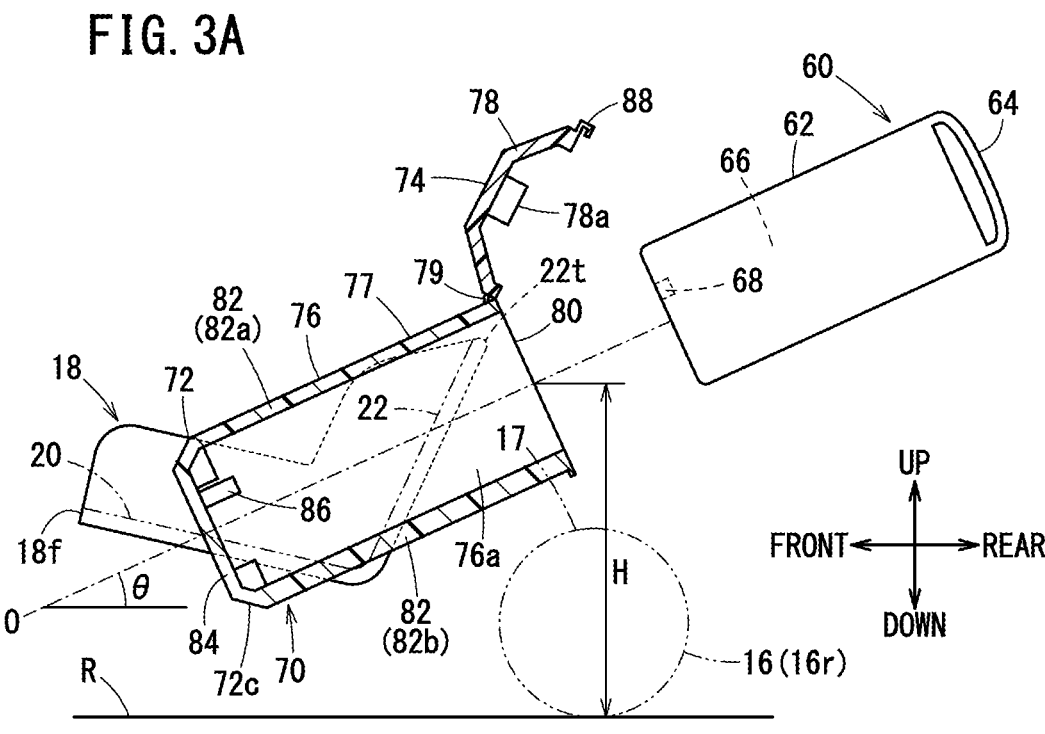
FIG. 3A is a side view schematically showing the arrangement of a rear wheel, a seat, and a battery case.

As shown in FIG. 3A, the lower end (corner portion 72c) of the front end portion 72 of each battery case 70 is located at a position lower than the upper portion (specifically, the upper end 17) of the rear wheel 16r and is thus located at a position sufficiently close to the road surface R. Thus, the center of gravity of the racing kart 12 can be lowered, and the traveling stability can be enhanced. An inclination angle θ between the road surface R and an axis O in the insertion/removal direction of the battery 60 in each battery case 70 is not particularly limited but is preferably set to be smaller than an inclination angle between the road surface R and the backrest portion 22 of the seat 18. For example, an actual value of the inclination angle θ may be set to be smaller than 90°, preferably within a range of 20° to 50°. As a result, an inclined side surface 77 on the upper side of the battery case 70 can appropriately let the relative wind flow rearward that hits the racing kart 12 from the front while the racing kart 12 is traveling.

As shown in FIGS. 2 and 3A, the rear end portion 74 of each battery case 70 is positioned further rearward than the seat 18 in a side view of the vehicle body 14 and is provided further upward than the rear wheels 16r (at a position overlapping the rear wheels 16r in a plan view of the vehicle body 14). That is, the rear end portion 74 of each battery case 70 is disposed at a position away from the seat 18 and the rear wheels 16r by a predetermined distance.

Each battery case 70 includes a housing main body 76 having a housing space 76a for housing the battery 60, and the lid 78 attached in a pivotable manner to the housing main body 76 via a hinge portion 79 at the opening 80 described later. The opening 80 communicating with the housing space 76a is provided at an upper portion (on the rear end portion 74 side) of the housing main body 76 closed by the lid 78.

The opening 80 of each battery case 70 is provided so as to be orthogonal to the axis O of the battery case 70 and is thereby inclined so as to face rearward and upward of the vehicle body 14. Each opening 80 is positioned further rearward than the seat 18 in a side view of the vehicle body 14, the opening 80 is provided at a position higher than the upper portion (specifically, the upper end 17) of the rear wheel 16r, at least part of the opening 80 is provided at the same height as the upper end 22t of the backrest portion 22 of the seat 18, and at least part of the opening 80 is provided further upward than the upper end 22t of the backrest portion 22 of the seat 18. Since the opening 80 is provided at a position higher than the upper portion (specifically, the upper end 17) of the rear wheel 16r, or is provided at the same height as the upper end 22t of the backrest portion 22 of the seat 18, or at least part of the opening 80 is provided further upward than the upper end 22t of the backrest portion 22 of the seat 18, the opening 80 can be provided at a height where the back of the user U sitting on the seat 18 touches the seat 18 and can be set at a position where the user does not need to bend their body much when placing or removing the battery 60. The height H of the center position of the opening 80 from the road surface R is preferably in a range of 50 cm to 100 cm, for example.

The opening 80 is closed by the lid 78. The housing main body 76 and the lid 78 has, across from the hinge portion 79, a lock mechanism 88 that interlocks the housing main body 76 and the lid 78 with each other. Interlocking the housing main body 76 and the lid 78 with each other in a state where the opening 80 is closed by the lid 78, the lock mechanism 88 prevents the battery 60 housed in the housing space 76a from being removed. The battery case 70 may omit the lid 78. Thus, it is possible to further simplify the attachment of the battery 60 to the battery case 70. In a configuration in which the lid 78 is omitted, the location where the opening 80 is formed corresponds to the rear end portion 74 of the battery case 70.

The housing main body 76 of the battery case 70 has four side walls 82 coupled to each other and a bottom wall 84 coupled to a lower portion of each side walls 82 to form the housing space 76a. The four side walls 82 and the bottom wall 84 define an axis O of the housing space 76a and guide the insertion/removal direction of the battery 60. In other words, the side walls 82 are provided in parallel to the insertion/removal direction of the battery 60.

Of the four side walls 82 of the housing main body 76, an upper side wall 82a located on an upper side and a lower side wall 82b located on a lower side may have a plurality of vent holes 83 that communicate with the housing space 76a. The relative wind during traveling of the racing kart 12 is taken into the housing space 76a through the plurality of vent holes 83 so that the battery 60 can be cooled by the relative wind.

In addition, the side wall 82b located on the lower side may be formed to be thicker than the other side walls 82 (the side wall 82a on the upper side). As a result, the lower side wall 82b has sufficient rigidity to withstand the load received from the battery 60 when the battery 60 is inserted and removed, whereby the battery 60 can be smoothly guided.

Terminals 86 are provided on a surface of the bottom wall 84 on the housing space 76a side. The terminals 86 are in electrical contact with the terminal 68 of the battery 60 in a state where the battery 60 is housed, whereby electric power can be output to the electrical unit of the racing kart 12.

Figure 3B:
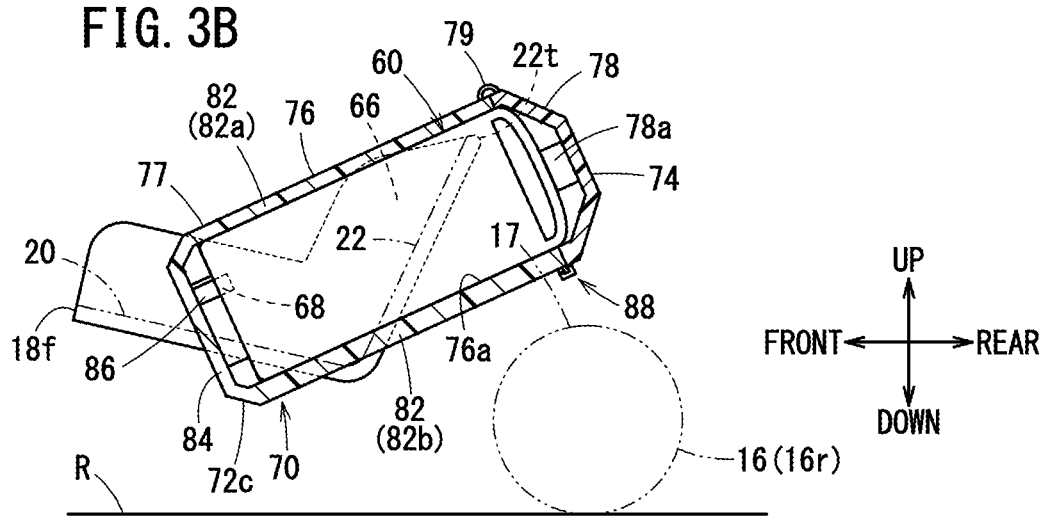
FIG. 3B is a side view schematically showing a state in which the battery is housed in a battery case.

The battery 60 installed in the battery case 70 is configured as a general-purpose type that is detachably installed on various devices. For example, as shown in FIGS. 3A and 3B, the battery 60 has a housing 62 that is formed in a rectangular column shape as a whole, and a handle 64 that is held by the user U and is provided at one axial end portion of the housing 62. The battery 60 includes in the housing 62 a plurality of battery cells 66 for storing and discharging electric power and also includes terminals 68 capable of inputting and outputting electric power at a predetermined position on an outer surface of the housing 62. The terminal 68 is provided, for example, on an end surface that is opposite to the surface where the handle 64 is present (or that is on the same side as the handle 64), and the terminal 68 comes into contact with the terminal 86 in the battery case 70 when the battery 60 is housed in the battery case 70.

In a state where the battery 60 is housed in the housing main body 76 and the lid 78 is closed (a locked state of the lock mechanism 88), an inner surface (a contact portion 78a) of the lid 78 comes into contact with and presses an upper end portion (for example, the handle 64) of the battery 60. As a result, the contact state between each of the terminals 68 of the battery 60 and each of the terminals 86 of the battery case 70 is maintained in a favorable manner.

As shown in FIG. 2, the ECU 56 is connected to an upper portion of the power adjustment unit 50, for example, and constitutes part of the electrical unit of the racing kart 12. The ECU 56 is configured by a computer including one or more processors, memories, input/output interfaces, electronic circuits, and suchlike. The ECU 56 acquires an accelerator operation amount of the accelerator pedal 40 and outputs an appropriate power command to the power adjustment unit 50 based on the accelerator operation amount, thereby controlling the rotation speed of the motor 48.

The ECU 56 is configured to appropriately distribute electric power of the batteries 60 housed in the pair of battery cases 70 to the motor 48 via a junction box (not shown). For example, the ECU 56 performs control in a manner so that electric power of one battery 60 is used until the remaining amount of the one battery 60 becomes equal to or less than a predetermined value, and when the remaining amount of the one battery 60 becomes equal to or less than the predetermined value, the electric power of the other battery 60 is used. Alternatively, the ECU 56 may be configured to use electric power of the two batteries 60 substantially equally. As an example, when the rotation speed of the motor 48 is low, electric power of one battery 60 is used, and when the rotation speed of the motor 48 is high, electric power of both batteries 60 is used.

The traveling vehicle 10 (racing kart 12) according to the present embodiment is basically configured in the manner described above. Hereinafter, a description will be given concerning operations of the traveling vehicle 10.

The user U (or a helper) of the racing kart 12 puts the battery 60 into each of the pair of battery cases 70 before traveling or the like. At this time, the user U turns the lid 78 with respect to the housing main body 76 to expose the opening 80 as illustrated in FIG. 3A.

As described above, in the case of the racing kart 12, the opening 80 of the battery case 70 is located further rearward than the seat 18 and further upward than the pair of rear wheels 16r. Accordingly, the user U can easily align a lower portion of the battery 60, which is a heavy object, with the opening 80 by accessing the opening 80 from the rear side of the vehicle body 14. Further, the user U inserts the battery 60 deeper in the housing space 76a by aligning the posture of the battery 60 with the axis O of the battery case 70. At this time, each side wall 82 of the battery case 70 smoothly guides the insertion of the battery 60 along the axis O, and the lower sides of the side walls 82b receive part of the load given by the battery 60.

As shown in FIG. 3B, when the lower portion of the battery 60 is inserted up to the vicinity of the bottom wall 84, the terminals 86 of the battery case 70 come into contact with the terminals 68 of the battery 60. Thereafter, when the user U closes the lid 78 and interlocks the housing main body 76 and the lid 78 by means of the lock mechanism 88, the battery case 70 prevents the battery 60 from being detached.

As shown in FIG. 1, when the user U sits on the seat 18 and turns on a starter switch and suchlike, the electric power of the battery 60 is supplied to each electrical unit to start the racing kart 12. By depressing the accelerator pedal 40 and gripping and operating the handle 32, the user drives the racing kart 12. The racing kart 12 includes, on both sides of the seat 18 in the vehicle width direction, the battery cases 70 in which the batteries 60 are housed, whereby the center of gravity of the entire batteries 60 is positioned on the widthwise center line CL. Further, since the center of gravity of the entire batteries 60 is positioned behind the seat 18 in the plan view of the vehicle body 14, the operability of the handle 32 by the user U is improved, and high turning performance is obtained.

As shown in FIG. 2, each battery 60, which inclines above the rear wheels 16r, i.e., whose one part (end) is provided forward of the rear wheels 16r and whose other part (end) is provided above the rear wheels 16r, can apply a load to a lower position of the vehicle body 14 and a position near each rear wheel 16r, and can enhance the gripping force of each rear wheel 16r. Furthermore, since the front end portion 72 of each battery case 70 is positioned further rearward than the front end 18f of the seat 18, since each battery case 70 inclines in such a way that the rear end portion 74 is located higher than the front end portion 72, and since the front side (front end portion 72) of each of the battery cases 70 is disposed at a lower position at the sides of the seat 18, it is possible to suppress blocking of a lateral field of view of the user U. That is, the racing kart 12 can further enhance the traveling stability by appropriately installing the battery cases 70 as described above.

During traveling, the racing kart 12 receives the relative wind from the front. Each battery case 70 inclining in such a way that the front end portion 72 is lower and the rear end portion 74 is higher easily lets the relative wind flow rearward. Therefore, the racing kart 12 can travel, suppressing the drag caused by the relative wind.

Since the pair of battery cases 70 including the pair of housing portion frames 26c are disposed at the sides and the adjacent positions of the seat 18, when another racing kart 12 collides with the racing kart 12 from the side, the other racing kart 12 is prevented from coming into contact with the user U. That is, the racing kart 12 can use each battery case 70 as a structure for protecting the user U.

The present invention is not limited to the above-described embodiments, and various modifications can be made within the scope of the invention. For example, the racing kart 12 may include a single battery case 70 at one side of the seat 18. In this case, the vehicle body 14 may be designed in such a way that the center of gravity formed by the battery 60 housed in the battery case 70 and the user U seated on the seat 18 is positioned substantially on the widthwise center line CL by shifting the seat 18 sideways from the widthwise center line CL.

Further, for example, the battery case 70 may be installed on the vehicle body 14 of the racing kart 12 in such a way that the height of the rear end portion 74 of the battery case 70 is lower than the upper end 22t of the seat 18. Further, the battery 60 and the battery case 70 may be formed to be smaller than those illustrated in FIGS. 1 to 3B, and a plurality of them are provided at one side of the seat 18 and a plurality of them are provided at the other side of the seat 18.

Figure 4:
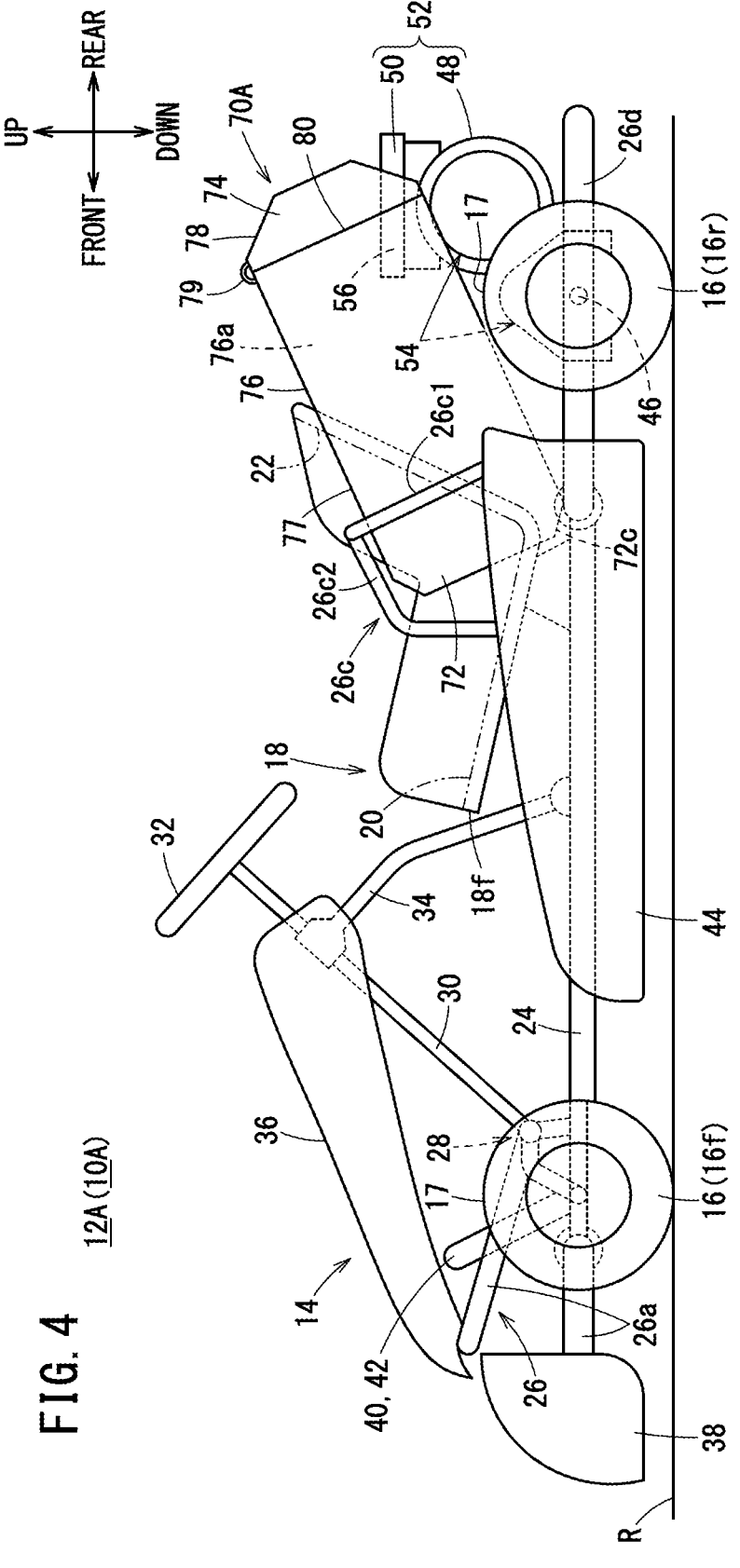
FIG. 4 is a side view of a racing kart according to a modified example.

As in a modified example shown in FIG. 4, a traveling vehicle 10A (racing kart 12A) may be configured in such a way that at least part of a battery case 70A protrudes rearward beyond the rear wheels 16r. To be more specific, the rear end portion 74 (the lid 78 and the opening 80) of the battery case 70A protrudes rearward beyond the rear wheels 16r. As a result, the easiness of the insertion/removal of the battery 60 with respect to the battery case 70 can be further enhanced.

The battery 60 may be not attachable to and detachable with respect to the battery housing portion (battery case 70). That is, the battery 60 and the battery housing portion may form a stationary battery that does not have the terminals 68 and 86, respectively, and that establishes electrical connection from the battery 60 to the electrical unit with a harness and suchlike.

A description will be given below concerning the technical concepts and advantageous effects capable of being grasped from the above-described embodiments.

One aspect of the present invention is the traveling vehicle 10, 10A including: the vehicle body 14 having the seat 18 on which the user U sits; and a plurality of wheels 16 provided to the vehicle body 14, wherein the height of at least part of the seating surface 20 of the seat 18 is lower than the upper portions of the plurality of wheels 16, the vehicle body 14 includes, at a side of the seat 18, the battery housing portion (battery case 70, 70A) that houses the battery 60, and the battery housing portion inclines in a manner so that at least part of the battery housing portion overlaps the seat 18 in a side view of the vehicle body 14 and the rear end portion 74 is positioned higher than the front end portion 72.

According to the above description, the traveling vehicle 10, 10A is provided so as to incline in such a way that the rear end portion 74 is higher than the front end portion 72 of the battery housing portion (the battery case 70, 70A), and thus the vehicle body 14 can be made lower than in a case where the traveling vehicle 10, 10A is disposed parallel to the vertical direction. As a result, the traveling vehicles 10 and 10A do not impair a front field of view and a side field of view of the user U, and can lower the center of gravity, improving the traveling stability. Further, the inclining battery housing portion effectively reduces the drag caused by the relative wind coming from the front. The battery housing portion disposed at the side of the seat 18 can protect the user U at the time of a side collision.

Further, the front end portion 72 of the battery housing portion (battery case 70, 70A) is located further rearward than the front end 18f of the seat 18. As a result, it is possible to prevent the battery housing portion from blocking a side view of the user U.

The rear end portion 74 of the battery housing portion (battery case 70, 70A) is located further rearward than the seat 18. As described above, since the rear end portion 74 of the battery housing portion provided at a side of the seat 18 is positioned rearward of the seat 18, the traveling vehicle 10, 10A can satisfactorily acquire a side view of the user U.

In a plan view of the vehicle body 14, at least part of the battery housing portion (battery case 70, 70A) is provided at a position overlapping the rear wheel 16r constituting part of the plurality of wheels 16. As a result, in the case of the traveling vehicles 10, 10A, the length of the vehicle body 14 in the front-rear direction can be made compact, and the load of the battery 60 tend to be applied to the vicinity of the rear wheels 16r, so that the ground contact load (gripping force) of the rear wheels 16r can be increased. In addition, since the battery housing portion is provided on the rear side, it becomes easier to acquire a lateral field of view of the user U.

The front end portion 72 of the battery housing portion (battery case 70, 70A) is provided further forward than the rear wheel 16r in a side view of the vehicle body, and the rear end portion 74 thereof is provided at a position overlapping the rear wheel 16r in a plan view of the vehicle body 14. As a result, each battery 60 housed in the battery housing portion applies a load to a lower position of the vehicle body 14 and a position in the vicinity of each rear wheel 16r, the gripping force of each rear wheel 16r can be enhanced.

The front end portion 72 of the battery housing portion (battery case 70, 70A) is provided further downward than the upper portion (upper end 17) of the rear wheel 16r. Thus, the center of gravity of the racing kart 12 can be lowered, and the traveling stability can be enhanced.

The battery 60 is attachable to and detachable from a battery housing portion (battery case 70, 70A), and the rear portion 74 of the battery housing portion is provided with the opening 80 configured to house the battery 60 or the opening/closing portion (lid 78) configured to open and close the opening 80. Accordingly, in the case of the traveling vehicles 10, 10A, the opening 80 for attaching and detaching the battery 60 can be placed higher than in a case where a battery housing portion is provided horizontally, and thus the amount of stooping (bending a body) by the user U can be reduced. Therefore, the user U can more easily insert and remove the battery 60.

At least part of the opening 80 or at least part of the opening/closing portion (lid 78) is provided at the same height as the upper end 22t of the seat 18 or further upward than the upper end 22t of the seat 18. As a result, the user U can insert and remove the battery 60 into and from battery housing portion (battery case 70, 70A) without greatly bending a body from an upright posture.

At least part of the battery housing portion (battery case 70, 70A) is provided further rearward than the rear wheel 16r constituting part of the plurality of wheels 16. Thus, the user U can easily insert and remove the battery 60 from the rear side of the vehicle body 14.

The vehicle body 14 further includes an electrical unit (PU 52) to which electric power is supplied from the battery 60. The electrical unit is provided further rearward than the seat 18 and at a position at which at least part of the electrical unit overlaps the seat when viewed in the front-rear direction of the vehicle body 14. As a result, it is possible to suppress the influence of the relative wind coming from the front on the electrical unit.

Further, the electrical unit (PU 52) is provided further downward than the upper end 22t of the seat 18. As a result, the racing kart 12 can travel while further suppressing the drag of the relative wind.

In addition, the electrical unit (PU 52) is provided at a position at which at least part of the electrical unit overlaps, in a side view of the vehicle body 14, the rear wheels 16r configuring part of the plurality of wheels 16. As a result, the electrical unit can apply a load to a position in the vicinity of each rear wheel 16r, and the grip force of each rear wheel 16r can be increased.

The invention claimed is:

1. A traveling vehicle comprising: a vehicle body including a seat on which a user sits; and a plurality of wheels provided to the vehicle body, wherein a height of at least part of a seating surface of the seat is lower than upper portions of the plurality of wheels, the seat includes a backrest portion, which inclines rearward and upward from the seating surface, the vehicle body includes, at a side of the backrest portion, a battery housing portion that houses a battery, the battery housing portion inclines in a manner so that: in a side view of the vehicle body, at least part of the battery housing portion overlaps the backrest portion and a rear end portion of the battery housing portion is positioned higher than a front end portion of the battery housing portion, a lower end of the front end portion of the battery housing portion is provided further downward than the upper portion of a rear wheel of the plurality of wheels, and at least part of the rear end portion of the battery housing portion is provided further upward than an upper end of the backrest portion.

2. The traveling vehicle according to claim 1, wherein the front end portion of the battery housing portion is located further rearward than a front end of the seat.

3. The traveling vehicle according to claim 1, wherein the rear end portion of the battery housing portion is located further rearward than the seat.

4. The traveling vehicle according to claim 1, wherein in a plan view of the vehicle body, at least part of the battery housing portion is provided at a position overlapping the rear wheel.

5. The traveling vehicle according to claim 4, wherein the front end portion of the battery housing portion is provided further forward than the rear wheel in the side view of the vehicle body, and the rear end portion of the battery housing portion is provided at a position overlapping the rear wheel in the plan view of the vehicle body.

6. The traveling vehicle according to claim 1, wherein the battery is attachable to and detachable from the battery housing portion, and the rear end portion of the battery housing portion is provided with an opening configured to house the battery or an opening/closing portion configured to open and close the opening.

7. The traveling vehicle according to claim 6, wherein at least part of the opening or at least part of the opening/ closing portion is provided at a same height as the upper end of the backrest portion or further upward than the upper end of the seat.

8. The traveling vehicle according to claim 6, wherein at least part of the battery housing portion is provided further rearward than the rear wheel of the plurality of wheels.

9. The traveling vehicle according to claim 1, further comprising an electrical unit to which electric power is supplied from the battery, wherein the electrical unit is provided further rearward than the seat and at a position at which at least part of the electrical unit overlaps the seat when viewed in a front-rear direction of the vehicle body.

10. The traveling vehicle according to claim 9, wherein the electrical unit is provided further downward than the upper end of the backrest portion.

11. The traveling vehicle according to claim 9, wherein the electrical unit is provided at a position at which at least part of the electrical unit overlaps, in the side view of the vehicle body, the rear wheel constituting part of the plurality of wheels.

* * * * *